United States Patent [19]
Worcester

[11] Patent Number: 4,564,542
[45] Date of Patent: Jan. 14, 1986

[54] BELT AND METHOD OF SPLICING THE SAME

[75] Inventor: Winthrop S. Worcester, Akron, Ohio

[73] Assignee: The B. F. Goodrich Company, Akron, Ohio

[21] Appl. No.: 714,143

[22] Filed: Mar. 20, 1985

[51] Int. Cl.$^4$ .......................... B32B 3/00; B32B 31/08; B32B 31/12

[52] U.S. Cl. ..................................... 428/58; 156/257; 156/258; 156/304.3; 156/304.5; 156/305

[58] Field of Search ................. 428/58; 156/257, 258, 156/304.3, 304.5, 305

Primary Examiner—Alexander S. Thomas
Attorney, Agent, or Firm—Joseph Januszkiewicz

[57] ABSTRACT

The method of splicing belt ends to form an endless belt wherein such belt has reinforcing cords extending longitudinally therethrough. The respective belt ends are sheared to provide complimentary mating faces which are cemented together. Slots are cut along the running length of both end belt sections across the splice line and spaced laterally from the reinforcing cords. Additional cords are placed into such slots and cemented to both sections to provide an integral endless belt.

9 Claims, 5 Drawing Figures

BELT AND METHOD OF SPLICING THE SAME

BACKGROUND OF THE INVENTION

This invention relates to a conveyor belt and more particularly to the spliced polyurethane belt sections having reinforced cords therein and to the method of splicing such belt sections.

The problem of splicing conveyor belts is common throughout industry. Endless belts are usually formed into a single length of belting cut to the desired length and thence have the respective ends spliced to one another to form an endless belt. For small belts it is possible to make or cast a single one piece integral continuous belt, however, splicing even there is necessary to repair these belts.

The spliced section of a belt is generally the weakest part of a belt. Many procedures and structures have been tried and used to splice belt sections but are quite complicated and involve complex manipulative steps. One common method used requires that the rubber and fabric at the ends of such belt sections be cut away completely to expose the cords and then mate the terminal ends of the cords followed by placing material on the ends to be spliced and then vulcanize or cure the material around the reinforcing cord. Such procedure is time consuming and does not provide for a strong splice. Another method is to overlap belt sections and mechanically interconnect such sections. Another method removed portions of the belt adjoining the ends to expose the cables or strands, placing the exposed strands in grooves of two newly formed plates of semi-cured material and then cure the splice with the strands on parallel side by side relationship. Here again the splice has inherent weakness in strength since the material of the spliced section is of different properties since the juncture is of different consistence, age and treatment.

In the present invention, grooves are cut into the belt end sections that are laterally spaced from the reinforcing cords or strands but parallel thereto. Thereafter cords such as KEVLAR ® are placed in such grooves and are cemented therein and thence cured. In this manner, there is less disturbance of the original material yet providing a spliced section that is stronger than other sections of the same conveyor belt.

SUMMARY OF THE INVENTION

The present invention provides a unique polyurethane belt splice and a novel method for splicing the end sections of a reinforced belt to form an endless belt wherein a minimum amount of belt material is removed to accomplish the splice. Small narrow grooves are cut into the respective belt sections, which grooves are spaced laterally from the reinforcing cords and are in longitudinal alignment. Reinforcing cords are placed into such grooves, and thence encased as by cementing with a polyurethane to chemically adhere the additional cables or cords to the belt sections.

DETAILED DESCRIPTION

Figure 1:
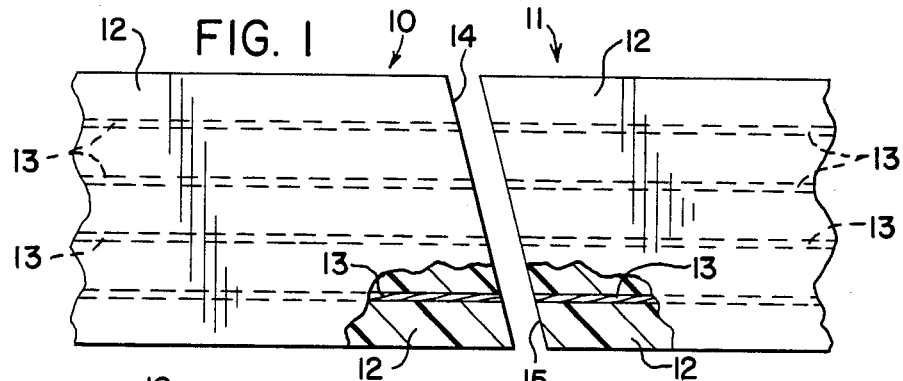
FIG. 1 is a plan view, partially broken away and cross sectioned, disclosing two belt end sections.
Figure 2:
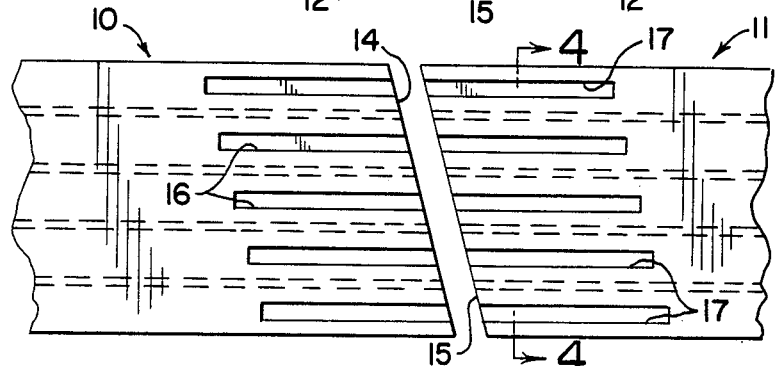
FIG. 2 is a plan view of two belt end sections having grooves cut therein parallel to the reinforcing cords.

Referring to the drawings wherein like reference numerals designate like or corresponding parts throughout the several views, there is shown in FIG. 1 the respective end belt sections 10 and 11 of an endless conveyor belt to be spliced. Such conveyor belt is made from a polyurethane material 12 reinforced with KEVLAR ® cords 13 that are in laterally spaced-apart relationship.

Figure 3:
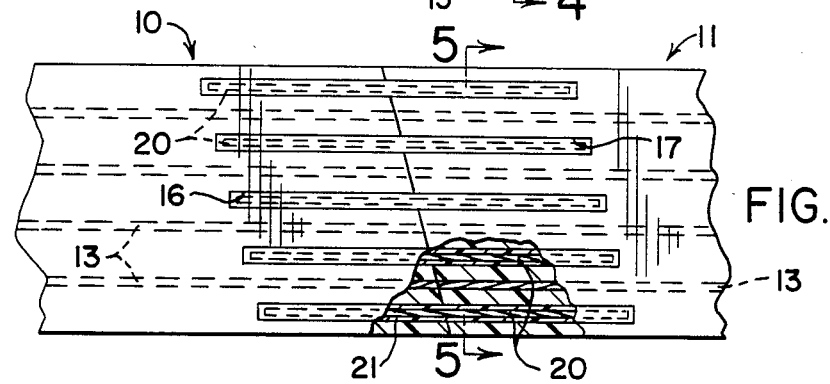
FIG. 3 is a plan view of two belt end sections of polyurethane spliced together showing the grooved sections with reinforcing cords therein and encased in cured belt material to form an integral belt.
Figure 4:
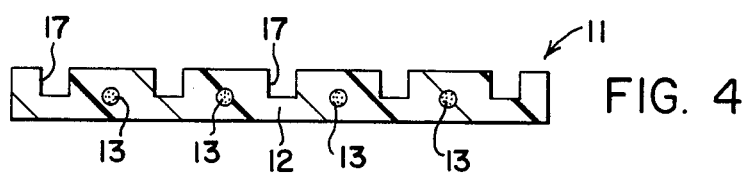
FIG. 4 is a cross sectional view of a belt end section taken on line 4—4 of FIG. 2.
Figure 5:
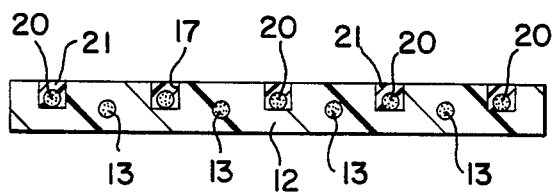
FIG. 5 is a cross sectional view of the spliced belt taken on line 5—5 of FIG. 3.

The respective two ends of end belt sections 10 and 11 are initially suitably sheared at bias angles leaving a pair of end faces 14 and 15. Thus the respective ends of the cables or cords 13 are cut clean leaving flat linear faces 14 and 15. The respective polyurethane end belt sections 10 and 11 are grooved as at 16 and 17, which grooves are narrow and laterally spaced from cords 13. The grooves 16 and 17 are slightly greater than the width of cords 13 and extend in a direction parallel to cords 13 a distance that is less than the width of the belt. The respective faces 14 and 15 of end belt sections 10 and 11 are aligned, cemented and brought into abutting engagement with each other. The cement used is a cement made from polyurethane. KEVLAR ® cords or strands 20 are then cemented as at 21 into the narrow grooves 16 and 17 and cured. The cement 21 encapsulates the cords 20 fully and has an upper surface that is flush with the top running surface of the polyurethane belt sections 10 and 11. As seen in FIG. 3, the cords or strands 13 extend for the full length of the grooves 16 and 17 to fully reinforce the spliced sections. Such splicing action is essentially a chemical splice providing a chemical bonding that is easy to perform at the site where the belt has been installed for use. In addition, such splicing assures an alignment of the respective end sections since the side edges determine the alignment and not the initial cables or cords. The completed belt has greater strength at the splice than at other portions thereof as the additional cords or cables span the splice line itself which is interconnnected by cementing the faces at the splice line and such additional cords are cemented along their full running length into both end sections. On completion, the belt end sections and the splice is a unitary homogeneous section of polyurethane material.

Various modifications are contemplated and may obviously be resorted to by those skilled in the art without departing from the described invention, as hereinafter defined by the appended claims, as only a preferred embodiment thereof has been disclosed.

I claim:

1. In a longitudinal extending endless reinforced belt having a first end belt section and a second end belt section, said end sections being cemented together across their abutting faces to define a splice line, said belt having a body proper with parallel reinforcing cords extending therethrough, said cords extending in the longitudinal direction of the belt for the entire length of such belt and terminating at said splice line, said endless reinforced belt having strands embedded therein and extending across said splice line into both of said end belt sections, said strands spaced laterally from said cords in said end belt sections, and said strands being cemented to the body proper of said end belt sections.

2. In a longitudinally extending endless reinforced belt as set forth in claim 1 wherein said splice line extends across said belt at a diagonal relative to the side edges thereof.

3. In a longitudinally extending endless reinforced belt as set forth in claim 2 wherein said belt is a polyurethane belt; and said strands are cemented by a polyurethane cement to said body proper of said polyurethane belt to form a uniform homogeneous belt throughout.

4. In a longitudinally extending endless reinforced belt as set forth in claim 3 wherein said strands are greater in number than said cords.

5. The method of splicing the respective end belt sections of a polyurethane belt having parallel reinforcing cords therein to form an endless belt comprising the steps of shearing the respective belt ends to form a linear face on each section, cutting narrow slots that are laterally spaced from said reinforcing cords in each of said end sections and with said slot in said sections being in alignment; cementing said faces of said end sections, and cementing cords into said aligned slots to form an integral endless conveyor belt.

6. The method of splicing the respective end belt sections as set forth in claim 5 wherein said cementing is done by a polyurethane cement to provide a chemical bonding and to further provide a homogeneous integral belt.

7. The method of splicing as set forth in claim 6 wherein said shearing of said belt ends is at a bias angle.

8. The method of splicing as set forth in claim 7 wherein slots are cut to a width that provides a slight clearance space to either side of cords received by said slots.

9. The method of splicing as set forth in claim 8 wherein said slots cut into said belt sections are greater in number than the number of reinforcing cords in said initial belt sections.

* * * * *